US012609954B2

(12) United States Patent

Mizushima et al.

(10) Patent No.: US 12,609,954 B2
(45) Date of Patent: Apr. 21, 2026

(54) ATTACK SCENARIO GENERATION APPARATUS, RISK ANALYSIS APPARATUS, METHOD, AND COMPUTER READABLE MEDIA

(71) Applicant: NEC Corporation, Tokyo (JP)

(72) Inventors: Ryo Mizushima, Tokyo (JP); Hirofumi Ueda, Tokyo (JP); Tomohiko Yagyu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 455 days.

(21) Appl. No.: 18/030,907

(22) PCT Filed: Oct. 22, 2020

(86) PCT No.: PCT/JP2020/039701
§ 371 (c)(1),
(2) Date: Apr. 7, 2023

(87) PCT Pub. No.: WO2022/085150
PCT Pub. Date: Apr. 28, 2022

(65) Prior Publication Data
US 2023/0379351 A1      Nov. 23, 2023

(51) Int. Cl.
*H04L 9/40*          (2022.01)
(52) U.S. Cl.
CPC ........ *H04L 63/1433* (2013.01); *H04L 63/145* (2013.01); *H04L 2463/146* (2013.01)
(58) Field of Classification Search
CPC .................................................. H04L 63/1433
See application file for complete search history.

(56) References Cited

U.S. PATENT DOCUMENTS

| | | | |
|---|---|---|---|
| 8,321,944 B1 * | 11/2012 | Mayer ................ | H04L 63/1433 726/25 |
| 10,185,924 B1 * | 1/2019 | McClintock ........ | H04L 63/1433 |
| 11,438,367 B2 * | 9/2022 | Basballe Sorensen ..................... | H04L 63/20 |

(Continued)

FOREIGN PATENT DOCUMENTS

| | | |
|---|---|---|
| JP | 2019-219898 A | 12/2019 |
| JP | 2020-129166 A | 8/2020 |

(Continued)

OTHER PUBLICATIONS

International Search Report for PCT Application No. PCT/JP2020/039701, mailed on Dec. 28, 2020.

(Continued)

*Primary Examiner* — Khang Do
(74) *Attorney, Agent, or Firm* — Sughrue Mion, PLLC

(57)          ABSTRACT

Generation of an attack scenario to be used for risk analysis of a system to be analyzed is enabled without depending on the technique and the knowledge of a person who creates it. An analysis result acquisition means acquires a risk analysis result of a first risk analysis performed on a system to be analyzed. A condition acquisition means acquires conditions for an attack scenario to be used for a second risk analysis on the basis of an attack scenario table and the risk analysis result. An attack scenario generation means generates an attack scenario to be used for the second risk analysis on the basis of the conditions for the attack scenario acquired by the condition acquisition means.

9 Claims, 11 Drawing Sheets

(56) References Cited

U.S. PATENT DOCUMENTS

| | | | | |
|---|---|---|---|---|
| 11,829,274 B1* | 11/2023 | Ghosh | ................. | G06F 11/3024 |
| 11,853,853 B1* | 12/2023 | Beauchesne | ........ | H04L 63/1433 |
| 2006/0191012 A1* | 8/2006 | Banzhof | .......... | G06Q 10/06311 |
| | | | | 726/25 |
| 2009/0099885 A1* | 4/2009 | Sung | ..................... | G06Q 10/06 |
| | | | | 726/25 |
| 2011/0185432 A1* | 7/2011 | Sandoval | ........... | H04L 63/1433 |
| | | | | 726/25 |
| 2011/0214183 A1* | 9/2011 | Fudge | .................. | G06F 11/008 |
| | | | | 726/25 |
| 2014/0137257 A1* | 5/2014 | Martinez | ............ | H04L 63/1433 |
| | | | | 726/25 |
| 2015/0256554 A1* | 9/2015 | Sakakibara | ........ | H04L 63/1425 |
| | | | | 726/25 |
| 2016/0285907 A1* | 9/2016 | Nguyen | ............. | H04L 63/1433 |
| 2016/0294854 A1* | 10/2016 | Parthasarathi | .......... | H04L 63/20 |
| 2017/0244740 A1* | 8/2017 | Mahabir | ............ | H04L 63/1433 |
| 2018/0337939 A1 | 11/2018 | Agarwal | | |
| 2018/0375892 A1* | 12/2018 | Ganor | ................ | G06Q 10/0635 |
| 2019/0052663 A1* | 2/2019 | Lee | ......................... | H04L 63/20 |
| 2019/0052664 A1* | 2/2019 | Kibler | .................. | G06F 11/301 |
| 2020/0045075 A1* | 2/2020 | Kliger | .................... | G06F 21/52 |
| 2020/0272972 A1* | 8/2020 | Harry | ................. | G06Q 10/0635 |
| 2020/0311284 A1* | 10/2020 | Sato | ....................... | G06F 21/577 |
| 2021/0218769 A1* | 7/2021 | Kawauchi | ........... | H04L 63/1433 |
| 2021/0264038 A1* | 8/2021 | Butchko | ............. | H04L 63/1433 |
| 2022/0053012 A1* | 2/2022 | Nishijima | ........... | H04L 63/1441 |
| 2022/0121739 A1* | 4/2022 | Kawauchi | ............... | G06F 21/55 |
| 2022/0147623 A1* | 5/2022 | Hirobe | .................. | G06F 21/577 |
| 2022/0171858 A1* | 6/2022 | Hirobe | ................... | G06F 21/57 |
| 2023/0017839 A1* | 1/2023 | Mizushima | ........... | G06F 21/552 |
| 2023/0379351 A1* | 11/2023 | Mizushima | ............. | G06F 21/57 |
| 2025/0150468 A1* | 5/2025 | Ando | ................. | H04L 63/1416 |
| 2025/0274474 A1* | 8/2025 | Koo | ................... | H04L 63/0209 |

FOREIGN PATENT DOCUMENTS

| | | |
|---|---|---|
| JP | 2020-160611 A | 10/2020 |
| JP | 2020-166521 A | 10/2020 |
| JP | 2020-166522 A | 10/2020 |

OTHER PUBLICATIONS

JP Office Action for JP Application No. 2022-556326, mailed on Sep. 3, 2024 with English Translation.

* cited by examiner

| CHECK ITEM | CHECK RESULT |
|---|---|
| ENTRANCE CONTROL IS NOT CARRIED OUT? | Y |
| . . . | . . . |
| USB IS USED? | Y |
| USE OF ADMINISTRATIVE PRIVILEGES IS RESTRICTED? | Y |
| . . . | . . . |
| EMAIL IS SENT AND RECEIVED? | Y |
| SERVER WITH CONFIDENTIAL INFORMATION EXISTS? | Y |
| . . . | . . . |
| CONTROL TERMINAL OF HMI etc. EXISTS? | Y |
| IPS IS INTRODUCED? | N |
| . . . | . . . |
| FW IS INTRODUCED? | Y |
| VULNERABILITY ISSUE EXISTS? | N |
| . . . | . . . |
| NW ISSUE EXISTS? | Y |

Fig. 3

ATTACK SCENARIO TABLE (ATTACKER)

| CHECK ITEM | ATTACK SCENARIO |
|---|---|
| ENTRANCE CONTROL IS NOT CARRIED OUT? | IF Y, ASSUME EXTERNAL ENTITY |
| · · · | · · · |
| USB IS USED? | IF Y, ASSUME INTERNAL ENTITY |
| EMAIL IS SENT AND RECEIVED? | IF Y, ASSUME INTERNAL ENTITY AND EXTERNAL ENTITY |

Fig. 4

ATTACK SCENARIO TABLE (ENTRY POINT OF ATTACK)

| CHECK ITEM | ATTACK SCENARIO |
|---|---|
| USE OF ADMINISTRATIVE PRIVILEGES IS RESTRICTED? | IF Y, GENERAL PRIVILEGES IF N, ADMINISTRATIVE PRIVILEGES |
| . . . | . . . |
| EMAIL IS SENT AND RECEIVED? | IF Y, FRAUDULENT MANIPULATION THROUGH MALWARE INFECTION |

Fig. 5

ATTACK SCENARIO TABLE (TARGET OF ATTACK AND FINAL ATTACK)

| CHECK ITEM | ATTACK SCENARIO |
|---|---|
| SERVER WITH CONFIDENTIAL INFORMATION EXISTS? | IF Y,<br>TARGET OF ATTACK: CONFIDENTIAL SERVER<br>FINAL ATTACK: DATA LEAK |
| . . . | . . . |
| CONTROL TERMINAL OF HMI etc. EXISTS? | IF Y,<br>TARGET OF ATTACK: CONTROL TERMINAL<br>FINAL ATTACK: FRAUDULENT MANIPULATION |

Fig. 6

ANALYSIS CONDITION TABLE

| CHECK ITEM | ANALYSIS CONDITIONS |
|---|---|
| IPS IS INTRODUCED? | IF N, RISK ANALYSIS USING VULNERABILITY |
| . . . | . . . |
| FW IS INTRODUCED? | IF N, RISK ANALYSIS USING DATA-FLOW |

Fig. 7

START

COLLECT RISK ANALYSIS RESULT ⟍S1

ACQUIRE ELEMENTS OF ATTACK SCENARIO ⟍S2

ACQUIRE ANALYSIS CONDITIONS ⟍S3

GENERATE ATTACK SCENARIO ⟍S4

PERFORM DETAILED RISK ANALYSIS ⟍S5

OUTPUT ANALYSIS RESULT ⟍S6

END

ANALYSIS CONDITION TABLE

| CHECK ITEM | ANALYSIS CONDITIONS |
|---|---|
| IPS IS INTRODUCED? | IF Y, RISK ANALYSIS CONSIDERING LEFT COLUMN |
| FW IS INTRODUCED? | IF Y, RISK ANALYSIS CONSIDERING LEFT COLUMN |
| VULNERABILITY ISSUE EXISTS? | IF Y, ANALYSIS USING VULNERABILITY |
| NW ISSUE EXISTS? | IF Y, ANALYSIS USING DATA-FLOW |
| . . . | . . . |

Fig. 9

ATTACK SCENARIO TABLE

| CHECK ITEM | ATTACK SCENARIO |
|---|---|
| ENTRANCE AND EXIT CONTROL IS NOT CARRIED OUT? | IF Y, ASSUME EXTERNAL ENTITY, THIS TERMINAL AS ENTRY POINT |
| NO RESTRICTIONS ARE IMPOSED ON DEVICE CONNECTION? | IF Y, ASSUME INTERNAL ENTITY, THIS TERMINAL AS ENTRY POINT |
| RISK OF PHYSICAL INTRUSION IS A OR HIGHER? | IF Y, FRAUDULENT MANIPULATION BY INTRUSION |
| RISK OF WRONG OPERATION IS A OR HIGHER? | IF Y, FRAUDULENT MANIPULATION BY MALWARE INFECTION |
| IMPORTANCE OF ASSET IS 3 OR GREATER AND RISK OF FRAUDULENT TRANSMISSION IS B OR HIGHER? | IF Y, TARGET OF ATTACK: THIS SERVER FINAL ATTACK: DATA LEAK |
| IMPORTANCE OF ASSET IS 3 OR GREATER AND RISK OF DEVICE SHUTDOWN IS B OR HIGHER? | IF Y, TARGET OF ATTACK: THIS SERVER FINAL ATTACK: BREAKDOWN |
| . . . | . . . |

Fig. 10

ATTACK SCENARIO GENERATION APPARATUS, RISK ANALYSIS APPARATUS, METHOD, AND COMPUTER READABLE MEDIA

This application is a National Stage Entry of PCT/JP2020/039701 filed on Oct. 22, 2020, the contents of all of which are incorporated herein by reference, in their entirety.

TECHNICAL FIELD

The present disclosure relates to an attack scenario generation apparatus, a risk analysis apparatus, an attack scenario generation method, a risk analysis method, and a computer readable medium.

TECHNICAL FIELD

In recent years, threats of cyber-attacks have not been limited to the fields of ICT (Information and Communication Technology), and cases of harm from such threats have been occurring also in the fields of control systems and IoT (Internet of Things). Particularly, in control systems, there have been cases that pose a threat to the operation of critical infrastructures, such as a shutdown of an electrical power system or plant. To defend against the threats of cyber-attacks, it is important to clarify the security risk of a system, implement countermeasures, and thereby reduce the risk.

As related art, Patent Literature 1 discloses a security measures review tool that reviews security measures against the threat of a cyber-attack. The security measures review tool disclosed in Patent Literature 1 has a threat database that defines the threat of a cyber-attack. For a threat, the security measures review tool calculates a risk value in a system to be analyzed. The security measures review tool determines whether the calculated risk value exceeds a reference value. The security measures review tool reviews security measures for the threat for which the risk value exceeds the reference value.

The above-described security measures review tool uses an attack scenario database, a measures database, and a threat measures correspondence database to review security measures. The attack scenario database stores, for each threat, an attack scenario created by analyzing an attack procedure of a cyber-attack. The security measures review tool has a cyber-attack scenario generation AI (Artificial Intelligence). The cyber-attack scenario generation AI learns attack scenarios by using the attack scenario database, and generates an attack scenario and each attack procedure of the attack scenario. The measures database stores security measures to reduce the threat. The threat measures correspondence database stores the threat of an attack by the attack scenario and the security measures stored in the measures database in association with each other. The security measures review tool refers to those databases and reviews a plurality of security measures against the attack scenario.

CITATION LIST

Patent Literature

Patent Literature 1: Japanese Unexamined Patent Application Publication No. 2019-219898

SUMMARY OF INVENTION

Technical Problem

In Patent Literature 1, an attack scenario used for the review of security measures is created by analyzing the attack procedure of a cyber-attack. In Patent Literature 1, when an attack scenario is created by an analyzer, whether or not the created attack scenario is suitable for a system to be analyzed depends on the technique and the knowledge of an analyst. Patent Literature 1 also describes the automation of the generation of an attack scenario by using the cyber-attack scenario generation AI. However, an attack scenario created by the cyber-attack scenario generation AI depends on learned data, and it is not always the case that an attack scenario suitable for a system to be analyzed is generated.

In view of the above-described circumstances, an object of the present disclosure is to provide an attack scenario generation apparatus, a risk analysis apparatus, a method, and a computer readable medium capable of generating an attack scenario to be used for risk analysis of a system to be analyzed without depending on the technique and the knowledge of a person who creates the attack scenario.

Solution to Problem

In order to achieve the above object, according to a first aspect of the present disclosure, there is provided an attack scenario generation apparatus. The attack scenario generation apparatus includes analysis result acquisition means for acquiring a risk analysis result of a first risk analysis performed on a system to be analyzed; condition acquisition means for acquiring conditions for an attack scenario on the basis of an attack scenario table storing an item possibly contained in the risk analysis result and conditions for an attack scenario to be used in a second risk analysis, and the risk analysis result acquired by the analysis result acquisition means; and attack scenario generation means for generating the attack scenario on the basis of the conditions for the attack scenario acquired by the condition acquisition means.

According to a second aspect of the present disclosure, there is provided a risk analysis apparatus. The risk analysis apparatus includes analysis result acquisition means for acquiring a risk analysis result of a first risk analysis performed on a system to be analyzed; condition acquisition means for acquiring conditions for an attack scenario on the basis of an attack scenario table storing an item possibly contained in the risk analysis result and conditions for an attack scenario to be used in a second risk analysis, and the risk analysis result acquired by the analysis result acquisition means; attack scenario generation means for generating the attack scenario on the basis of the conditions for the attack scenario acquired by the condition acquisition means; and risk analysis means for performing the second risk analysis on the system to be analyzed by using the attack scenario generated by the attack scenario generation means.

According to a third aspect of the present disclosure, there is provided an attack scenario generation method. The attack scenario generation method includes acquiring a risk analysis result of a first risk analysis performed on a system to be analyzed; acquiring conditions for an attack scenario on the basis of an attack scenario table storing an item possibly contained in the risk analysis result and conditions for an attack scenario to be used in a second risk analysis, and the acquired risk analysis result; and generating the attack scenario on the basis of the acquired conditions for the attack scenario.

According to a fourth aspect of the present disclosure, there is provided a risk analysis method. The risk analysis method includes acquiring a risk analysis result of a first risk analysis performed on a system to be analyzed; acquiring conditions for an attack scenario on the basis of an attack scenario table storing an item possibly contained in the risk analysis result and conditions for an attack scenario to be used in a second risk analysis, and the acquired risk analysis result; generating the attack scenario on the basis of the acquired conditions for the attack scenario; and performing the second risk analysis on the system to be analyzed by using the generated attack scenario.

According to a fifth aspect of the present disclosure, there is provided a computer readable medium. The computer readable medium stores a program causing a computer to execute a process including acquiring a risk analysis result of a first risk analysis performed on a system to be analyzed; acquiring conditions for an attack scenario on the basis of an attack scenario table storing an item possibly contained in the risk analysis result and conditions for an attack scenario to be used in a second risk analysis, and the acquired risk analysis result; and generating the attack scenario on the basis of the acquired conditions for the attack scenario.

According to a sixth aspect of the present disclosure, there is provided a computer readable medium. The computer readable medium stores a program causing a computer to execute a process including acquiring a risk analysis result of a first risk analysis performed on a system to be analyzed; acquiring conditions for an attack scenario on the basis of an attack scenario table storing an item possibly contained in the risk analysis result and conditions for an attack scenario to be used in a second risk analysis, and the acquired risk analysis result; generating the attack scenario on the basis of the acquired conditions for the attack scenario; and performing the second risk analysis on the system to be analyzed by using the generated attack scenario.

Advantageous Effects of Invention

An attack scenario generation apparatus, a risk analysis apparatus, a method, and a computer readable medium according to the present disclosure are capable of generating an attack scenario to be used for risk analysis of a system to be analyzed without depending on the technique and the knowledge of a person who creates the attack scenario.

BRIEF DESCRIPTION OF DRAWINGS

FIG. 3 is a view showing a specific example of a risk analysis result.

FIG. 4 is a view showing an example of an attack scenario table contained in a matching DB.

FIG. 5 is a view showing another example of an attack scenario table contained in the matching DB.

FIG. 6 is a view showing another example of an attack scenario table contained in the matching DB.

FIG. 7 is a view showing an example of an analysis condition table contained in the matching DB.

FIG. 9 is a view showing an example of an analysis condition table stored in a matching DB according to a second example embodiment of the present disclosure.

FIG. 10 is a view showing an example of an attack scenario table when an asset-based risk analysis result is used.

EXAMPLE EMBODIMENT

Figure 1:
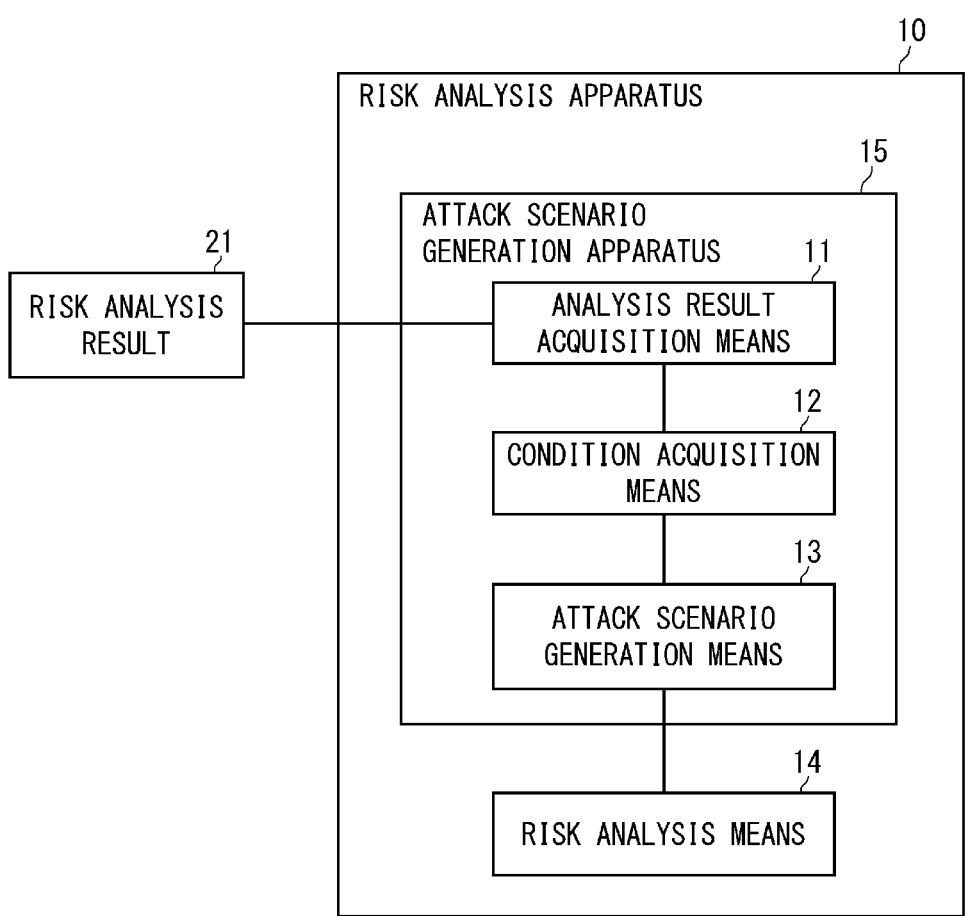
FIG. 1 is a block diagram showing a schematic configuration of a risk analysis apparatus according to the present disclosure.

Prior to describing an example embodiment of the present disclosure, an overview of the present disclosure will be described. FIG. 1 shows a schematic configuration of a risk analysis apparatus according to the present disclosure. A risk analysis apparatus 10 includes analysis result acquisition means 11, condition acquisition means 12, attack scenario generation means 13, and risk analysis means 14. The analysis result acquisition means 11, the condition acquisition means 12, and the attack scenario generation means 13 constitute an attack scenario generation apparatus 15.

The analysis result acquisition means 11 acquires a risk analysis result 21 of a first risk analysis performed on a system to be analyzed. The first risk analysis may be a risk analysis that can be performed in a simple way. The condition acquisition means 12 acquires conditions for an attack scenario on the basis of an attack scenario table storing an item possibly contained in the risk analysis result and conditions for an attack scenario to be used in a second risk analysis, and details of the risk analysis result 21 acquired by the analysis result acquisition means 11.

The attack scenario generation means 13 generates an attack scenario on the basis of the conditions for an attack scenario acquired by the condition acquisition means 12. The risk analysis means 14 performs a second risk analysis on the system to be analyzed by using the attack scenario generated by the attack scenario generation means 13.

In the present disclosure, the attack scenario generation apparatus 15 is able to generate an attack scenario in accordance with details of the risk analysis result 21 by using the risk analysis result 21, which is a result of the first risk analysis. Therefore, the attack scenario generation apparatus 15 is able to generate an attack scenario to be used for risk analysis of a system to be analyzed without depending on the technique and the knowledge of a person who creates the attack scenario. Further, the risk analysis apparatus 10 is able to perform the second risk analysis by using the generated attack scenario.

Figure 2:
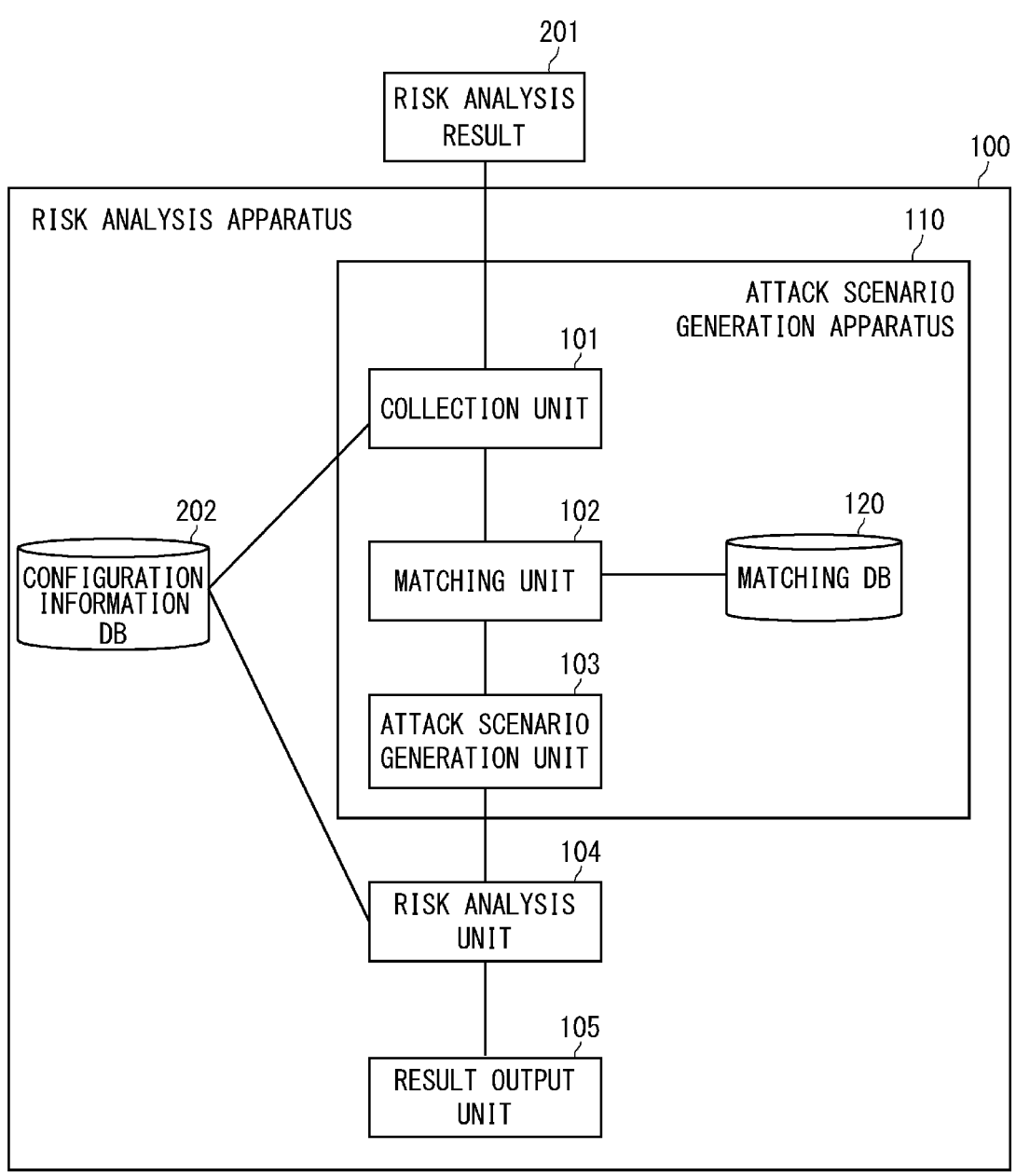
FIG. 2 is a block diagram showing a risk analysis apparatus according to a first example embodiment of the present disclosure.

An example embodiment of the present disclosure will be described hereinafter in detail. FIG. 2 shows a risk analysis apparatus 100 according to a first example embodiment of the present disclosure. The risk analysis apparatus 100 includes a collection unit 101, a matching unit 102, an attack scenario generation unit 103, a risk analysis unit 104, a result output unit 105, and a matching DB (database) 120. In the risk analysis apparatus 100, the collection unit 101, the matching unit 102, the attack scenario generation unit 103, and the matching DB 120 constitute an attack scenario generation apparatus 110. The risk analysis apparatus 100 corresponds to the risk analysis apparatus 10 shown in FIG. 1. The attack scenario generation apparatus 110 corresponds to the attack scenario generation apparatus 15 shown in FIG. 1.

Note that the attack scenario generation apparatus 110 is not necessarily included in the risk analysis apparatus 100. The attack scenario generation apparatus 110 may be configured as a separate apparatus from the risk analysis apparatus 100. Further, the matching DB 120 is not necessarily a part of the risk analysis apparatus 100 and the attack scenario generation apparatus 110 as long as it is accessible from them. For example, the matching DB 120 may run on a cloud, and the risk analysis apparatus 100 and the attack scenario generation apparatus 110 may access the matching DB 120 on the cloud through a network.

A risk analysis result 201 of a system for which a detailed risk analysis is to be performed is input to the risk analysis apparatus 100. The risk analysis result 201 indicates a result of checking the suitability of security measures of the system to be analyzed, for example. The risk analysis result 201 may indicate a result of analyzing the security risk of the system according to the baseline approach, for example. The risk analysis result 201 includes check items and check results indicating whether requirements of the check items are satisfied, for example. The risk analysis result 201 corresponds to the risk analysis result 21 shown in FIG. 1.

FIG. 3 shows a specific example of the risk analysis result 201. The risk analysis result 201 has check items such as "entrance control is not carried out?", "USB (Universal Serial Bus) is used?", "use of administrative privileges is restricted?", and "email is sent and received?", for example. In the risk analysis result 201, when entrance control is not carried out in a system to be analyzed, for example, the check item "entrance control is not carried out?" is marked "Y (Yes)". When entrance control is carried out in a system to be analyzed, the check item "entrance control is not carried out?" is marked "N (No)".

Since a risk analysis with the baseline approach is performed by checking predetermined requirements of measures, the man-hour of work is not large. Further, since a risk analysis with the baseline approach is performed on the basis of existing criteria, the analysis result can be used as a guide for a certain level of evaluation. However, a risk analysis with the baseline approach is to check the suitability level with respect to criteria for measures, and it is not a risk analysis appropriate to the circumstances of a system to be analyzed. Further, a risk analysis result with the baseline approach is used merely in an indirect manner as a supportive factor for not causing harm to the business.

In this example embodiment, the risk analysis apparatus 100 performs a detailed risk analysis by using the risk analysis result 201. To be specific, in the risk analysis apparatus 100, the attack scenario generation apparatus 110 generates an attack scenario by using the risk analysis result 201. The attack scenario contains information indicating who an attacker is, where an entry point used for an attack is, where an asset as a target of a final attack is located, and what the type of a final attack is, for example. Further, the attack scenario generation apparatus 110 generates analysis conditions for the detailed risk analysis by using the risk analysis result 201. The analysis conditions include analysis using data-flow, analysis using vulnerability, and analysis using an attack in which a user is involved, for example. The risk analysis apparatus 100 performs the detailed risk analysis on a system to be analyzed by using the generated attack scenario and analysis conditions. In this example embodiment, it is assumed that effects of the lack of security measures are mainly checked in the detailed risk analysis.

The collection unit 101 of the attack scenario generation apparatus 110 collects the risk analysis result 201. The risk analysis result 201 may be a result of a risk analysis with the baseline approach performed on a system to be analyzed. Alternatively, the risk analysis result 201 may be a result of a risk analysis performed for each asset of a system to be analyzed. The risk analysis result 201 may be a result of a risk analysis performed for each specified unit, such as each subnetwork, for example, in a system to be analyzed.

Further, the collection unit 101 acquires configuration information of a system to be analyzed from a configuration information DB 202. The configuration information DB 202 contains each of assets that form a system, a network configuration, vulnerability, an open port, account information, and information related to software, for example. The configuration information DB 202 may be a part of the risk analysis apparatus 100 and the attack scenario generation apparatus 110. The collection unit 101 corresponds to the analysis result acquisition means 11 shown in FIG. 1.

The matching DB 120 stores check items that can be contained in the risk analysis result 201 and conditions (parameters) for an attack scenario in association with each other. In this example embodiment, the matching DB 120 stores an attack scenario table that associates check items with parameters of an attack scenario. Further, the matching DB 120 stores check items that can be contained in the risk analysis result 201 and analysis conditions for a detailed risk analysis in association with each other. In this example embodiment, the matching DB 120 stores an analysis condition table that associates check items with analysis conditions. The matching unit 102 refers to the matching DB 120 and acquires a parameter of an attack scenario and analysis conditions on the basis of the risk analysis result 201. The matching unit 102 corresponds to the condition acquisition means 12 shown in FIG. 1.

FIG. 4 shows an example of an attack scenario table contained in the matching DB 120. The attack scenario table shown in FIG. 4 contains check items and information indicating an attacker. For example, when the check result is "Y" for the check item "entrance control is not carried out?" in the risk analysis result 201, the matching unit 102 acquires "external entity" as information indicating an attacker in the attack scenario. For example, when the check result is "Y" for the check item "email is sent and received?" in the risk analysis result 201, the matching unit 102 acquires "internal entity" and "external entity" as information indicating an attacker in the attack scenario.

FIG. 5 shows another example of an attack scenario table contained in the matching DB 120. The attack scenario table shown in FIG. 5 contains check items and information indicating an entry point used for an attack. For example, when the check result is "Y" for the check item "use of administrative privileges is restricted?" in the risk analysis result 201, the matching unit 102 acquires "general privileges" as information indicating an entry point in the attack scenario. When the check result is "N" for the check item "use of administrative privileges is restricted?", the matching unit 102 acquires "administrative privileges" as information indicating an entry point in the attack scenario. Further, for example, when the check result is "Y" for the check item "email is sent and received?" in the risk analysis result 201, the matching unit 102 acquires "fraudulent manipulation through malware infection" as information indicating an entry point in the attack scenario. The matching unit 102 may identify a terminal or the like that sends and receives email by using information acquired from the configuration information DB 202.

FIG. 6 shows another example of an attack scenario table contained in the matching DB 120. The attack scenario table shown in FIG. 6 contains check items and information indicating a target of an attack being an important asset (final attack target asset) and a final attack (its type). For example, when the check result is "Y" for the check item "server with confidential information exists?" in the risk analysis result 201, the matching unit 102 acquires "confidential server" as information indicating the target of an attack in the attack scenario. Further, the matching unit 102 acquires "data leak" as information indicating a final attack. When the check result is "Y" for the check item "control terminal of HMI (Human Machine Interface) etc. exists?", the matching unit 102 acquires "control terminal" as information indicating the target of an attack in the attack scenario. Further, the matching unit 102 acquires "fraudulent manipulation" as information indicating a final attack. The matching unit 102 may identify a server with confidential information, a control terminal with HMI and the like by using information acquired from the configuration information DB 202.

FIG. 7 shows an example of an analysis condition table contained in the matching DB 120. The attack scenario table shown in FIG. 7 contains check items and analysis conditions for the detailed risk analysis. For example, when the check result is "N" for the check item "IPS (Intrusion Prevention System) is introduced?" in the risk analysis result 201, the matching unit 102 acquires "risk analysis using vulnerability" as analysis conditions for the detailed risk analysis. When the check result is "N" for the check item "FW (Fire Wall) is introduced?" in the risk analysis result 201, the matching unit 102 acquires "risk analysis using data-flow" as analysis conditions for the detailed risk analysis.

Referring back to FIG. 2, the attack scenario generation unit 103 generates an attack scenario on the basis of the parameters of the attack scenario acquired by the matching unit 102. For example, the attack scenario generation unit 103 generates a plurality of attack scenarios by combining the attacker, the entry point, the target of an attack, and the final attack acquired by the matching unit 102. The parameters of the attack scenario acquired by the matching unit 102 vary depending on the risk analysis result 201. Accordingly, the attack scenario generated by the attack scenario generation unit 103 varies depending on the risk analysis result 201. The attack scenario generation unit 103 corresponds to the attack scenario generation unit 103 shown in FIG. 1.

The risk analysis unit 104 refers to the configuration information DB 202 and performs a detailed risk analysis on the system to be analyzed by using the attack scenario generated by the attack scenario generation unit 103 (the attack scenario generation apparatus 110). In the detailed risk analysis, when an attack starts at the entry point contained in the attack scenario, for example, the risk analysis unit 104 analyzes whether an attack indicated by the type of the final attack is possible against the attack target asset. Stated in a different way, the risk analysis unit 104 analyzes whether an attack path (attack tree) from the entry point to the final attack against the target of an attack is formed or not. The risk analysis unit 104 may refer to configuration information stored in the configuration information DB 202 and perform the detailed risk analysis by substituting assets contained in the system to be analyzed for "confidential server", "control terminal" and the like in the attack scenario.

When analysis conditions are acquired by the matching unit 102, the risk analysis unit 104 performs the detailed risk analysis according to the analysis conditions. For example, when "risk analysis using vulnerability" is acquired as the analysis conditions by the matching unit 102, the risk analysis unit 104 analyzes whether an attack using vulnerability is possible in the detailed risk analysis.

When a USB is used and when email is sent and received in a certain terminal, for example, the risk analysis unit 104 performs the detailed risk analysis, assuming this asset as the starting point of an attack. When an account is shared, the risk analysis unit 104 performs the detailed risk analysis, assuming that credential information is stored in advance. When data-flow such as SMB (Server Message Block) is used, the risk analysis unit 104 performs the detailed risk analysis using the data-flow. When vulnerability management, antivirus software, or whitelist is used, the risk analysis unit 104 performs the detailed risk analysis using vulnerability. The risk analysis unit 104 corresponds to the risk analysis means 14 shown in FIG. 1.

The result output unit 105 outputs a result of the detailed risk analysis performed by the risk analysis unit 104. For example, the result output unit 105 displays the result of the detailed risk analysis on a display device or the like, which is not shown.

Figure 8:
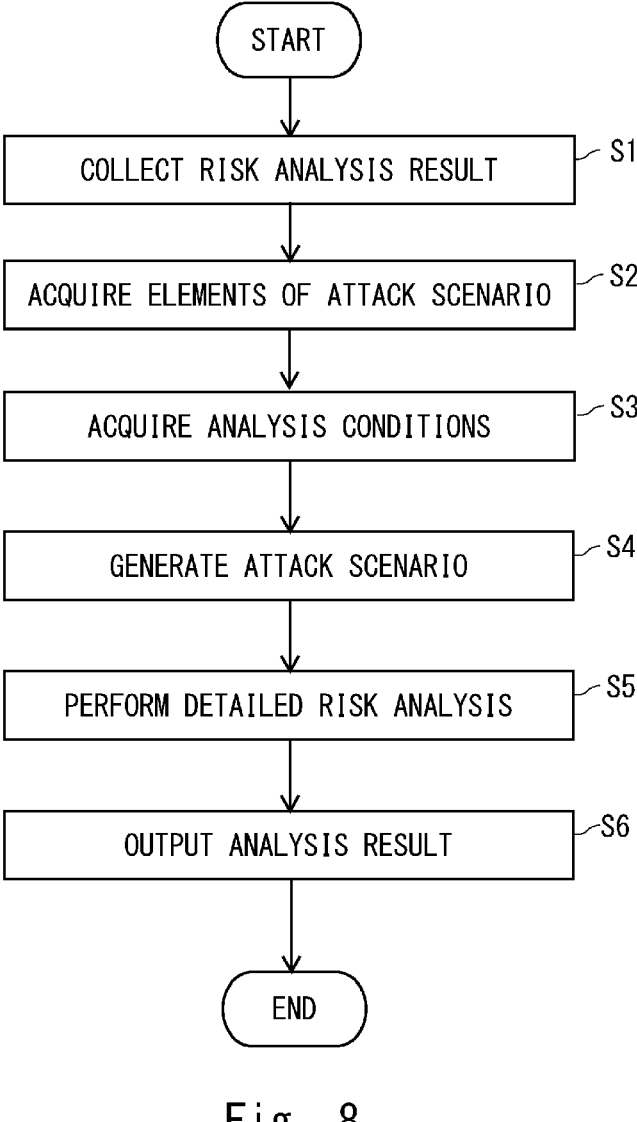
FIG. 8 is a flowchart showing an operation procedure of a risk analysis apparatus.

An operation procedure of the risk analysis apparatus 100 will be described hereinafter. FIG. 8 shows an operation procedure (risk analysis method) of the risk analysis apparatus 100. The collection unit 101 collects the risk analysis result 201 (Step S1). Further, the collection unit 101 acquires configuration information of a system to be analyzed from the configuration information DB 202.

The matching unit 102 acquires parameters of an attack scenario on the basis of the risk analysis result 201 acquired in Step S1 and the attack scenario table stored in the matching DB 120 (Step S2). Further, the matching unit 102 acquires analysis conditions for a detailed risk analysis on the basis of the risk analysis result 201 and the analysis condition table stored in the matching DB 120 (Step S4). The attack scenario generation unit 103 generates an attack scenario on the basis of the parameters of the attack scenario acquired in Step S2 (Step S4). Steps S1 to S4 correspond to the operation procedure (attack scenario generation method) of the attack scenario generation apparatus 110.

The risk analysis unit 104 acquires the attack scenario from the attack scenario generation unit 103, and acquires configuration information from the configuration information DB 202. The risk analysis unit 104 performs a detailed risk analysis of the system to be analyzed on the basis of the attack scenario and the configuration information (Step S5). The result output unit 105 outputs a result of the detailed risk analysis performed by the risk analysis unit 104 (Step S6). When an attack path is formed in the detailed risk analysis, for example, the result output unit 105 displays this attack path on a display device.

In this example embodiment, the attack scenario generation apparatus 110 generates an attack scenario from the risk analysis result 201 by using the attack scenario table. The attack scenario generation apparatus 110 is able to generate an attack scenario appropriate to the circumstances of a system to be analyzed from the risk analysis result 201 of checking the suitability level with respect to criteria for measures, for example. Therefore, in this example embodiment, the attack scenario generation apparatus 110 is able to generate an attack scenario to be used for a detailed risk analysis of a system to be analyzed without depending on the technique and the knowledge of a person who creates the attack scenario. Further, the risk analysis apparatus 100 performs the detailed risk analysis by using the attack scenario generated by the attack scenario generation apparatus 110 and is thereby able to analyze the possibility of harm to the business in the system to be analyzed.

For example, a user can recognize that measures to reduce vulnerability are not taken from the risk analysis result 201 of conducting a risk analysis with the baseline approach. The risk analysis apparatus 100 performs the detailed risk analysis by using the attack scenario and the analysis conditions generated from the risk analysis result 201. For example, when IPS is not introduced, the risk analysis apparatus 100 performs the detailed risk analysis on vulnerability and analyzes whether an attack can reach an important asset. The user sees a result of this detailed risk analysis and is thereby able to recognize effects on the system caused by the fact that no measures are taken to reduce vulnerability.

A second example embodiment of the present disclosure will be described hereinafter. The configuration of a risk analysis apparatus according to this example embodiment is the same as the risk analysis apparatus 100 described in the first example embodiment shown in FIG. 2. In this example embodiment, a detailed risk analysis is performed mainly to verify effects of implemented security measures. The other operation may be the same as the operation in the first example embodiment.

FIG. 9 shows an example of an analysis condition table stored in the matching DB 120 according to this example embodiment. For example, when the check result is "Y" for the check item "IPS is introduced?", the analysis condition table stores a risk analysis where IPS is taken into consideration as analysis conditions of the detailed risk analysis. Further, when the check result is "Y" for the check item "FW is introduced?", the analysis condition table stores a risk analysis where FW is taken into consideration as analysis conditions of the detailed risk analysis.

When the check result is "Y" for the check item "vulnerability issue exists?", the analysis condition table stores a risk analysis using vulnerability as analysis conditions for the detailed risk analysis. When the check result is "Y" for the check item "NW (network) issue exists?", the analysis condition table stores a risk analysis using data-flow as analysis conditions for the detailed risk analysis. The attack scenario table may be the same as the attack scenario table used in the first example embodiment.

In this example embodiment, a user can recognize that network isolation is done, for example, from a risk analysis result with the baseline approach. The risk analysis apparatus 100 performs the detailed risk analysis by using the attack scenario and the analysis conditions generated from the risk analysis result 201. For example, the risk analysis apparatus 100 performs the detailed risk analysis on data-flow and analyzes whether an attack can reach an important asset. The user sees a result of this detailed risk analysis and is thereby able to check whether security measures are enough or not, such as whether network isolation is properly done, for example.

When IPS is introduced, the risk analysis apparatus 100 performs the detailed risk analysis on vulnerability, for example. A user checks whether IPS is implemented in an attack path output as the detailed risk analysis result. When there is an attack path in which IPS is not implemented, a user is able to recognize the lack of security measures.

Note that the first example embodiment and the second example embodiment can be combined as appropriate. For example, in the detailed risk analysis, the risk analysis apparatus 100 may perform both of checking the effects of the lack of security measures and verifying the effects of implemented security measures. Alternatively, the risk analysis apparatus 100 may be configured to be able to switch between checking the effects of the lack of security measures and verifying the effects of implemented security measures according to user selection.

In the above-described example embodiments, examples of generating an attack scenario by using a risk analysis result with the baseline approach are described. The present disclosure, however, is not limited thereto. An asset-based risk analysis result may be used instead of a risk analysis result with the baseline approach. The asset-based risk analysis is an analysis method that assesses a risk for each of assets constituting a system to be protected, by using its importance (its value), the possibility of occurrence of a possible threat, and vulnerability to the threat as three assessment indices. An asset-based risk analysis result (analysis sheet) contains information such as the importance of an asset to be analyzed, a possible threat (the way of an attack), a risk value of each threat, and measures being taken against each threat. The matching unit 102 may acquire parameters of an attack scenario and analysis conditions on the basis of the asset-based risk analysis result.

FIG. 10 shows an example of an attack scenario table when an asset-based risk analysis result is used. The attack scenario table may contain a risk value against a threat, the importance of an asset, the details of the threat, and measures being taken against the threat, or a combination of them, and parameters of an attack scenario. For example, when "Y" is marked for "entrance and exit control is not carried out", the attack scenario table stores, as information indicating an attacker in the attack scenario, information assuming the attacker to be an external entity using this asset (terminal) as an entry point. Further, when "Y" is marked for "no restrictions are imposed on device connection", the attack scenario table stores, as information indicating an attacker in the attack scenario, information assuming the attacker to be an internal entity using this terminal as an entry point. Whether entrance and exit control is carried out or not and whether restrictions are imposed on devices or not can be determined on the basis of measures being taken against a threat contained in the asset-based risk analysis result.

The matching unit 102 may analyze an asset-based risk analysis result and acquire parameters of an attack scenario by using this analysis result and the above-described attack scenario table. Further, the matching unit 102 may analyze an asset-based risk analysis result and acquire analysis conditions for a detailed risk analysis on the basis of this analysis result and the analysis condition table. For example, the matching unit 102 refers to measures being taken against a threat contained in the asset-based risk analysis result, and checks whether IPS is introduced, for example, as measures against the threat. Depending on whether IPS is introduced or not, the matching unit 102 may acquire analysis conditions for the detailed risk analysis from the analysis condition table shown in FIG. 7, for example.

Figure 11:
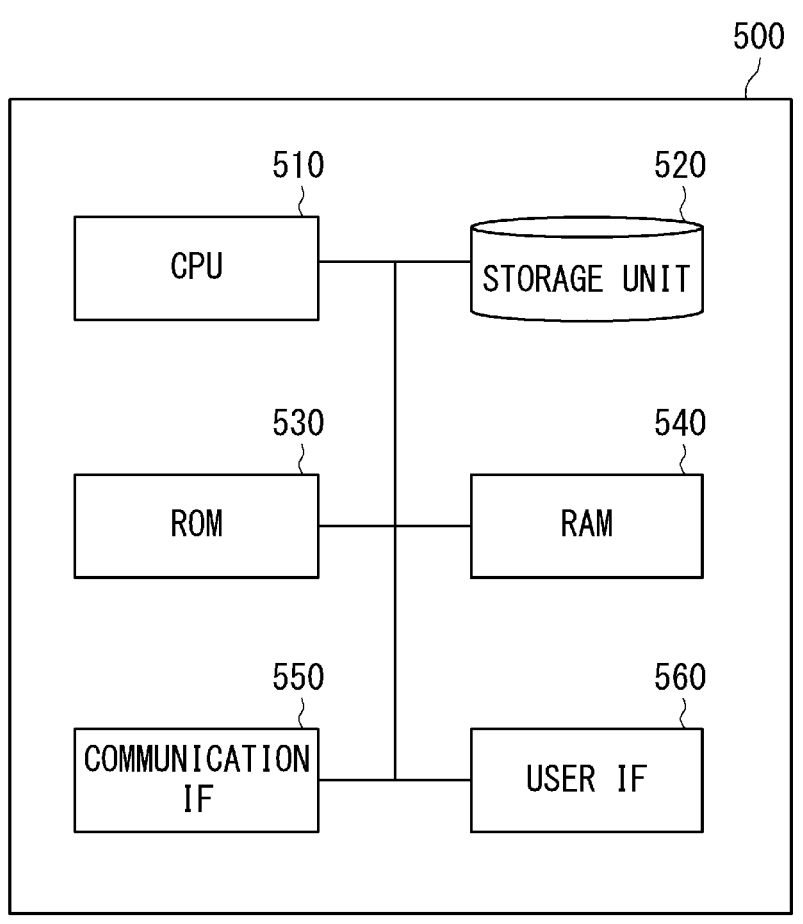
FIG. 11 is a block diagram showing a configuration example of a computer apparatus.

A physical configuration of the risk analysis apparatus 100 and the attack scenario generation apparatus 110 is described hereinafter. FIG. 11 shows a configuration example of a computer apparatus that can be used as the risk analysis apparatus 100 or the attack scenario generation apparatus 110. A computer apparatus 500 includes a control unit (CPU: Central Processing Unit) 510, a storage unit 520, a ROM (Read Only Memory) 530, a RAM (Random Access Memory) 540, a communication interface (IF: Interface) 550, and a user interface 560.

The communication interface 550 is an interface for connecting the information processing apparatus 500 and a communication network through a wired communication means, a wireless communication means or the like. The user interface 560 includes a display unit such as a display. The user interface 560 further includes an input unit such as a keyboard, a mouse, and a touch panel.

The storage unit 520 is an auxiliary storage device for storing various types of data. The storage unit 520 is not necessarily a part of the computer apparatus 500, and it may be an external storage device or a cloud storage that is connected to the computer apparatus 500 through a network. The storage unit 520 can be used as at least one of the matching DB 120 and the configuration information DB 202 shown in FIG. 2, for example.

The ROM 530 is a nonvolatile storage device. A semiconductor storage device such as a flash memory with relatively small capacity can be used for the ROM 530, for example. A program executed by the CPU 510 can be stored in the storage unit 520 or the ROM 530. The storage unit 520 or the ROM 530 stores various programs for implementing the functions of the elements of the risk analysis apparatus 100 or the attack scenario generation apparatus 110, for example.

The above-described program can be stored using any type of non-transitory computer readable media and provided to the computer apparatus 500. The non-transitory computer readable media include any type of tangible storage media. Examples of non-transitory computer readable media include magnetic storage media such as flexible disks, magnetic tapes or hard disks, optical magnetic storage media such as magneto-optical disks, optical disc media such as CD (Compact Disc) or DVD (Digital Versatile Disk), and semiconductor memories such as mask ROM, PROM (Programmable ROM), EPROM (Erasable PROM), flash ROM or RAM (Random Access Memory). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The RAM 540 is a volatile storage device. A semiconductor memory device such as DRAM (Dynamic Random Access Memory) or SRAM (Static Random Access Memory) is used as the RAM 540. The RAM 540 can be used as an internal buffer that temporarily stores data or the like. The CPU 510 develops, on the RAM 540, a program stored in the storage unit 520 or the ROM 530 and executes it. The CPU 510 executes the program, and thereby the functions of the elements of the risk analysis apparatus 100 and the attack scenario generation apparatus 110 are implemented. The CPU 510 may include an internal buffer for temporarily storing data or the like.

While the present disclosure has been described in detail with reference to example embodiments thereof, the present disclosure is not limited to the above-described example embodiments, and various changes and modifications may be made therein without departing from the spirit and scope of the present disclosure.

For example, the whole or part of the example embodiments disclosed above can be described as, but not limited to, the following supplementary notes.

Supplementary Note 1

An attack scenario generation apparatus comprising:
analysis result acquisition means for acquiring a risk analysis result of a first risk analysis performed on a system to be analyzed;
condition acquisition means for acquiring, based on an attack scenario table storing an item possibly contained in the risk analysis result and conditions for an attack scenario to be used in a second risk analysis, and the risk analysis result acquired by the analysis result acquisition means, conditions for an attack scenario; and attack scenario generation means for generating the attack scenario based on the conditions for the attack scenario acquired by the condition acquisition means.

Supplementary Note 2

The attack scenario generation apparatus according to Supplementary Note 1, wherein
the attack scenario contains information indicating an attacker, information indicating an entry point of an attack, information indicating an attack target, and information indicating a type of a final attack, and
the attack scenario table stores at least one of the information indicating an attacker, the information indicating an entry point of an attack, the information indicating an attack target, or the information indicating a type of a final attack as the conditions for the attack scenario corresponding to the item.

Supplementary Note 3

The attack scenario generation apparatus according to Supplementary Note 2, wherein the attack scenario generation means generates the attack scenario by combining the information indicating an attacker, the information indicating an entry point of an attack, the information indicating an attack target, and the information indicating a type of a final attack acquired by the condition acquisition means.

Supplementary Note 4

The attack scenario generation apparatus according to any one of Supplementary Notes 1 to 3, wherein
in the risk analysis result, the item is a check item indicating whether specified requirements are satisfied, and
the condition acquisition means acquires the conditions for the attack scenario depending on whether the check item contained in the risk analysis result acquired by the analysis result acquisition means indicates that the specified requirements are satisfied.

Supplementary Note 5

The attack scenario generation apparatus according to any one of Supplementary Notes 1 to 4, wherein the condition acquisition means further acquires analysis conditions based on an analysis condition table storing an item possibly contained in the risk analysis result and analysis conditions in the second risk analysis, and the risk analysis result acquired by the analysis result acquisition means.

Supplementary Note 6

The attack scenario generation apparatus according to Supplementary Note 5, wherein the analysis conditions include analysis using data-flow, analysis using vulnerability, and analysis using a user-involved attack.

Supplementary Note 7

The attack scenario generation apparatus according to Supplementary Note 5 or 6, wherein the risk analysis result contains an item indicating whether security measures are taken, and
the condition acquisition means acquires the analysis conditions in accordance with details of the item indicating whether security measures are taken contained in the risk analysis result acquired by the analysis result acquisition means.

Supplementary Note 8

A risk analysis apparatus comprising:

analysis result acquisition means for acquiring a risk analysis result of a first risk analysis performed on a system to be analyzed;

condition acquisition means for acquiring, based on an attack scenario table storing an item possibly contained in the risk analysis result and conditions for an attack scenario to be used in a second risk analysis, and the risk analysis result acquired by the analysis result acquisition means, conditions for an attack scenario;

attack scenario generation means for generating the attack scenario based on the conditions for the attack scenario acquired by the condition acquisition means; and risk analysis means for performing the second risk analysis on the system to be analyzed by using the attack scenario generated by the attack scenario generation means.

Supplementary Note 9

The risk analysis apparatus according to Supplementary Note 8, wherein the attack scenario contains information indicating an attacker, information indicating an entry point of an attack, information indicating an attack target, and information indicating a type of a final attack, and the attack scenario table stores at least one of the information indicating an attacker, the information indicating an entry point of an attack, the information indicating an attack target, or the information indicating a type of a final attack as the conditions for the attack scenario corresponding to the item.

Supplementary Note 10

The risk analysis apparatus according to Supplementary Note 9, wherein the risk analysis means analyzes whether the attacker starts an attack at the entry point of the attack and an attack indicated by the type of the final attack is possible in an asset as the attack target in the system to be analyzed.

Supplementary Note 11

The risk analysis apparatus according to any one of Supplementary Notes 8 to 10, wherein in the risk analysis result, the item is a check item indicating whether specified requirements are satisfied, and the condition acquisition means acquires the conditions for the attack scenario depending on whether the check item contained in the risk analysis result acquired by the analysis result acquisition means indicates that the specified requirements are satisfied.

Supplementary Note 12

The risk analysis apparatus according to any one of Supplementary Notes 8 to 11, wherein the condition acquisition means further acquires analysis conditions on the basis of an analysis condition table storing an item possibly contained in the risk analysis result and analysis conditions in the second risk analysis, and the risk analysis result acquired by the analysis result acquisition means, and the risk analysis means performs the second risk analysis in accordance with the analysis conditions acquired by the condition acquisition means.

Supplementary Note 13

The risk analysis apparatus according to Supplementary Note 12, wherein the analysis conditions include analysis using data-flow, analysis using vulnerability, and analysis using a user-involved attack.

Supplementary Note 14

An attack scenario generation method comprising:

acquiring a risk analysis result of a first risk analysis performed on a system to be analyzed;

acquiring, based on an attack scenario table storing an item possibly contained in the risk analysis result and conditions for an attack scenario to be used in a second risk analysis, and the acquired risk analysis result, conditions for an attack scenario; and generating the attack scenario based on the acquired conditions for the attack scenario.

Supplementary Note 15

A risk analysis method comprising:

acquiring a risk analysis result of a first risk analysis performed on a system to be analyzed;

acquiring, based on an attack scenario table storing an item possibly contained in the risk analysis result and conditions for an attack scenario to be used in a second risk analysis, and the acquired risk analysis result, conditions for an attack scenario;

generating the attack scenario based on the acquired conditions for the attack scenario; and performing the second risk analysis on the system to be analyzed by using the generated attack scenario.

Supplementary Note 16

A non-transitory computer readable medium storing a program causing a computer to execute a process comprising:

acquiring a risk analysis result of a first risk analysis performed on a system to be analyzed;

acquiring, based on an attack scenario table storing an item possibly contained in the risk analysis result and conditions for an attack scenario to be used in a second risk analysis, and the acquired risk analysis result, conditions for an attack scenario; and generating the attack scenario based on the acquired conditions for the attack scenario.

Supplementary Note 17

A non-transitory computer readable medium storing a program causing a computer to execute a process comprising:

acquiring a risk analysis result of a first risk analysis performed on a system to be analyzed;

acquiring, an attack scenario table storing an item possibly contained in the risk analysis result and conditions for an attack scenario to be used in a second risk analysis, and the acquired risk analysis result, conditions for an attack scenario;

generating the attack scenario based on of the acquired conditions for the attack scenario; and performing the second risk analysis on the system to be analyzed by using the generated attack scenario.

REFERENCE SIGNS LIST

10: RISK ANALYSIS APPARATUS
11: ANALYSIS RESULT ACQUISITION MEANS
12: CONDITION ACQUISITION MEANS
13: ATTACK SCENARIO GENERATION MEANS
14: RISK ANALYSIS MEANS
15: ATTACK SCENARIO GENERATION APPARATUS
21: RISK ANALYSIS RESULT
100: RISK ANALYSIS APPARATUS
101: COLLECTION UNIT
102: MATCHING UNIT
103: ATTACK SCENARIO GENERATION UNIT
104: RISK ANALYSIS UNIT
105: RESULT OUTPUT UNIT
110: ATTACK SCENARIO GENERATION UNIT
120: MATCHING DB
201: RISK ANALYSIS RESULT
202: CONFIGURATION INFORMATION DB
500: COMPUTER APPARATUS
510: CPU
520: STORAGE UNIT
530: ROM
540: RAM
550: COMMUNICATION IF
560: USER IF

What is claimed is:

1. An attack scenario generation apparatus comprising:
a memory storing instructions; and
a processor configured to execute the instructions to:
acquire a risk analysis result of a first risk analysis performed on a system to be analyzed;
acquire, based on an attack scenario table storing an item contained in the risk analysis result and conditions for an attack scenario to be used in a second risk analysis, and the acquired risk analysis result, conditions for the attack scenario;
acquire analysis conditions based on an analysis condition table storing the item contained in the risk analysis result and the analysis conditions to be used in the second risk analysis, and the acquired risk analysis result;
generate the attack scenario based on the acquired conditions for the attack scenario; and
perform the second risk analysis on the system using the generated attack scenario and the analysis conditions.

2. The attack scenario generation apparatus according to claim 1, wherein
the attack scenario contains information indicating an attacker, information indicating an entry point of an attack, information indicating an attack target, and information indicating a type of a final attack, and
the attack scenario table stores at least one of the information indicating an attacker, the information indicating an entry point of an attack, the information indicating an attack target, or the information indicating a type of a final attack as the conditions for the attack scenario corresponding to the item.

3. The attack scenario generation apparatus according to claim 2, wherein the processor is configured to execute the instructions to generate the attack scenario by combining the information indicating an attacker, the information indicating an entry point of an attack, the information indicating an attack target, and the information indicating a type of a final attack acquired as the conditions for the attack scenario.

4. The attack scenario generation apparatus according to claim 1, wherein
in the risk analysis result, the item is a check item indicating whether specified requirements are satisfied, and
the processor is configured to execute the instructions to acquire the conditions for the attack scenario depending on whether the check item contained in the acquired risk analysis result indicates that the specified requirements are satisfied.

5. The attack scenario generation apparatus according to claim 1, wherein the analysis conditions include analysis using data-flow, analysis using vulnerability, and analysis using a user-involved attack.

6. The attack scenario generation apparatus according to claim 1, wherein the risk analysis result contains an item indicating whether security measures are taken, and
the processor is configured to execute the instructions to acquire the analysis conditions in accordance with details of the item indicating whether security measures are taken contained in the acquired risk analysis result.

7. The attack scenario generation apparatus according to claim 1, wherein the processor is configured to execute the instructions to analyze whether the attacker starts an attack at the entry point of the attack and an attack indicated by the type of the final attack is possible in an asset as the attack target in the system to be analyzed.

8. An attack scenario generation method comprising:
acquiring a risk analysis result of a first risk analysis performed on a system to be analyzed;
acquiring, based on an attack scenario table storing an item contained in the risk analysis result and conditions for an attack scenario to be used in a second risk analysis, and the acquired risk analysis result, conditions for the attack scenario;
acquiring analysis conditions based on an analysis condition table storing the item contained in the risk analysis result and the analysis conditions to be used in the second risk analysis, and the acquired risk analysis result;
generating the attack scenario based on the acquired conditions for the attack scenario; and
perform the second risk analysis on the system using the generated attack scenario and the analysis conditions.

9. A non-transitory computer readable medium storing a program causing a computer to execute a process comprising:
acquiring a risk analysis result of a first risk analysis performed on a system to be analyzed;
acquiring, based on an attack scenario table storing an item contained in the risk analysis result and conditions for an attack scenario to be used in a second risk analysis, and the acquired risk analysis result, conditions for the attack scenario;
acquire analysis conditions based on an analysis condition table storing the item contained in the risk analysis result and the analysis conditions to be used in the second risk analysis, and the acquired risk analysis result;

generating the attack scenario based on the acquired conditions for the attack scenario; and perform the second risk analysis on the system using the generated attack scenario and the analysis conditions.

\* \* \* \* \*